(12) United States Patent
Huang

(10) Patent No.: US 8,762,875 B2
(45) Date of Patent: Jun. 24, 2014

(54) POSTING ACTIVITY VISUALIZATION

(75) Inventor: Joseph Jyh-Huei Huang, San Francisco, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 107 days.

(21) Appl. No.: 13/336,722

(22) Filed: Dec. 23, 2011

(65) Prior Publication Data

US 2013/0167041 A1   Jun. 27, 2013

(51) Int. Cl.
*G06F 3/048* (2013.01)

(52) U.S. Cl.
USPC .......................................................... 715/772

(58) Field of Classification Search
CPC ............................ G06F 17/30265; G06F 21/36
USPC ......................................... 715/772; 345/156
See application file for complete search history.

(56) References Cited

U.S. PATENT DOCUMENTS

| | | | | |
|---|---|---|---|---|
| 5,434,959 | A | * | 7/1995 | Von Ehr et al. ............... 345/441 |
| 5,491,779 | A | * | 2/1996 | Bezjian ......................... 345/440 |
| 5,844,572 | A | * | 12/1998 | Schott .......................... 345/440 |
| 6,515,681 | B1 | | 2/2003 | Knight |
| 7,748,017 | B2 | | 6/2010 | Kiiskinen |
| 7,865,511 | B2 | | 1/2011 | Kahn et al. |
| 7,895,227 | B1 | | 2/2011 | Henderson |
| 2002/0130868 | A1 | * | 9/2002 | Smith ........................... 345/440 |
| 2006/0167579 | A1 | * | 7/2006 | Fujii et al. .................... 700/109 |
| 2006/0190333 | A1 | | 8/2006 | Choi |
| 2007/0282940 | A1 | | 12/2007 | Sakurai |
| 2008/0033815 | A1 | | 2/2008 | Choi |
| 2008/0147487 | A1 | | 6/2008 | Hirshberg |
| 2010/0156665 | A1 | * | 6/2010 | Krzyzanowski et al. 340/870.02 |
| 2010/0159995 | A1 | * | 6/2010 | Stallings et al. .............. 455/566 |
| 2010/0162182 | A1 | | 6/2010 | Oh et al. |
| 2011/0265007 | A1 | | 10/2011 | Torres |
| 2011/0270690 | A1 | | 11/2011 | Martin-Cocher et al. |
| 2012/0246093 | A1 | * | 9/2012 | Stibel et al. .................. 705/347 |

OTHER PUBLICATIONS

EESR dated May 18, 2012 for EP 11195703.
European Office Action dated Jun. 28, 2013 for European Application No. 11195703.1.
Byron, L., et al., "Stacked Graphs—Geometry & Aesthetics," Visualization and Computer Graphics, IEEE Transactions, vol. 14, Issue 6, ISSN 1077-2626; Nov.-Dec. 2008.
Clark, J., "Neoformix Discovering and Illustrating Patterns in Data", http://neoformic.com/2008/TwitterVenn.html, Dec. 17, 2008.
PointCast(dot.com); http://en.wikipedia.org/wiki/PointCase_%28dotcom%29, updated Nov. 9, 2011.

(Continued)

*Primary Examiner* — Amy Ng
*Assistant Examiner* — Sang H Kim
(74) *Attorney, Agent, or Firm* — Jeffrey N. Giunta; Fleit Gibbons Gutman Bongini & Bianco PL

(57) ABSTRACT

Method and systems to display posting volumes. An activity package data item containing data items for each of at least one data feed source is received on a device. The device has a user interface that is changeably configurable between one of a locked mode and an unlocked mode, where the locked mode has reduced user input capability. A representation of the posting characterizations is displayed in response to receiving the activity package data item when the user interface is configured into the locked mode.

17 Claims, 7 Drawing Sheets

(56) References Cited

OTHER PUBLICATIONS

International Search Report and Written Opinion dated Mar. 11, 2013 for PCT/CA2012/050920.

European Summons to attend Oral Proceedings Pursuant to Rule 115(1) EPC dated Jan. 22, 2014 for European Application No. 11195703.1.

* cited by examiner

|  | SOURCE A (310) | | SOURCE B (312) | |
|---|---|---|---|---|
| TIME (314) | VOLUME POSTED (320) | KEYWORD CONTAINING (322) | VOLUME POSTED (324) | KEYWORD CONTAINING (326) |
| 5:00 | 30 | 2 | 50 | 2 |
| 10:00 | 50 | 8 | 800 | 15 |
| 15:00 | 13 | 6 | 333 | 0 |
| 20:00 | 7 | 0 | 485 | 6 |
| 25:00 | 28 | 12 | 603 | 18 |

FIG. 3

| ENCODED VALUE (402) | SOURCE A VOLUME RANGE (404) | SOURCE B VOLUME RANGE (406) |
|---|---|---|
| 0 | 0 | 0 |
| 1 | 5 | 100 |
| 2 | 15 | 300 |
| 3 | 30 | 500 |

FIG. 4

|  | SOURCE A (510) | | SOURCE B (512) | |
|---|---|---|---|---|
| TIME (520) | VOLUME POSTED (522) | KEYWORD CONTAINING (524) | VOLUME POSTED (526) | KEYWORD CONTAINING (528) |
| 5:00 | 3 | 1 | 0 | 1 |
| 10:00 | 3 | 2 | 3 | 3 |
| 15:00 | 1 | 2 | 2 | 0 |
| 20:00 | 1 | 0 | 2 | 2 |
| 25:00 | 2 | 3 | 3 | 3 |

FIG. 5

POSTING ACTIVITY VISUALIZATION

FIELD OF THE DISCLOSURE

The present disclosure generally relates to communicating and presenting information and more particularly to presenting posting activity rate information to a user on a display.

BACKGROUND

Social feeds are the central focus of social network sites. For example, many social network sites have user interfaces that dedicate a majority of the screen real estate to the feed which displays, for example, a constantly updated stream of friend status updates, photos, social game notifications, etc. Due to the growing number of different social networks, managing and parsing all these different feeds become increasingly difficult. Users can simply be overwhelmed by the sheer volume of posting activity received from their feeds. Additionally, much of the activity may not even be of relevance or concern to the user.

Monitoring social networks on a portable electronic device, such as on a smartphone, often involves selectively launching individual social network applications to check their social feeds and browse for relevant updates. This "hunt and peck" process can be tedious and time consuming, especially if the user does not discover until opening a particular social network application that the associated social network feed contains no interesting or relevant information at the moment.

Therefore, the ease of identifying interesting or relevant information in multiple social network feeds is limited by present techniques to monitor social network postings.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates a social network activity timeline table, according to one example;

FIG. 4 illustrates a quantizing threshold value table, according to one example;

FIG. 5 illustrates an encoded social network posting table according to one example;

DETAILED DESCRIPTION

Figure 1:
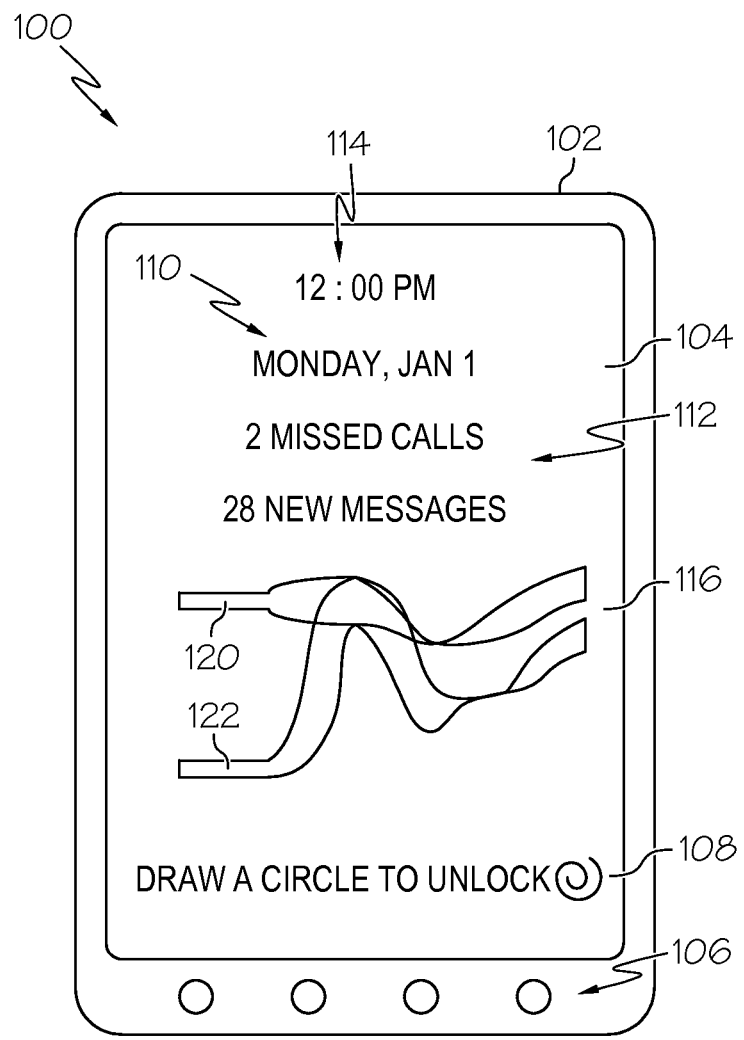
FIG. 1 illustrates a locked user display, according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Described below are systems and methods to monitor postings from a number of data feed sources, such as postings from social network "feeds," and provide to a user statistics of such postings that are addressed to that user. In one example, a number of social network sources are monitored to determine the number of postings that are addressed to a user and the number of those postings that contain keywords of interest to the user.

Data packets that contain characterizations these determined numbers of postings, i.e., posting characterizations, are sent to a user's device and displayed to the user. In one use of this information, the information is presented to the user of a portable electronic device on a locked display screen to allow easy monitoring even when not actively using the portable electronic device. By presenting this summary social source posting characterizations, the user is engaged and notified of a possible interest in investigating a particular social feed with higher confidence that something interesting or relevant is happening in real time. Such systems and methods are able to effectively direct a user attention and operate to make the most efficient use of the user's time.

In one example, an animated data visualization is presented on the locked display screen of the portable electronic device. This animated data visualization consists of multiple displayed curves, where each displayed curve represents postings received from a different social network data feed or source. The displayed curves are able to be color coded to help the user distinguish between the curves. The color coding is able to be defined by a user, by a system operator, or by another entity. The displayed curves may be animated with a regular flux or rhythm, such as an apparent "heart beat," to indicate that the social network source associated with a particular displayed curve is active and that the monitoring is constantly working. The volume of activity in social feed is able to be reflected, for example, by a dynamic change in amplitude. Examples of keywords that are monitored for mention in the received postings include the user's name or user specified keywords. The number of occurrences of keywords is able to be indicated, for example, by a dynamic change in the width of the displayed trace, such as by modification of a displayed trace's stroke weight.

In one example, a social feed activity package is delivered to a user's device at a pre-determined frequency, e.g., every 5 minutes. The frequency is able to be adjusted to accommodate, for example, operational concerns such as minimal battery consumption. Upon reception of an activity package, the displayed curve is updated to reflect the current volume of posting activity and any mention of the user's name or keywords. In one example, if a social network source posting activity suddenly spikes (i.e. suddenly increases dramatically), the vertical position of the displayed trace representing that source increases. If there was mention of the user's name in a received posting, or the occurrence of a specific user defined keywords such as "pizza" or "football," the width or stroke weight of the displayed curve increases.

This information is able to be of great interest to a user. For example, a sudden spike in volume/activity in postings for a particular social network source may indicate that something big or interesting is going on. For example, the occurrences of natural disasters such as earthquakes often result in a sudden spike in social network postings. The spike in social network postings often precedes updates to Government web sites and the official notification of an alert regarding the nature disaster.

FIG. 1 illustrates portable electronic device 102 having a locked user display 100, according to one example. The portable electronic device 102 in this example is a personal communications device such as a smartphone, tablet computer, personal digital assistant (PDA), or other device that a person uses exchange information with one or more sources. In one example, the portable electronic device 102 is able to exchange information with one or more remote data systems by sending, receiving, or sending and receiving information over a communications link.

The locked user display 100 depicts an example of a portable electronic device 102 that has a touch screen display 104 which is in a locked, or inactive, state. When the touch screen 104 is not in an inactive state, as is understood by practitioners of ordinary skill in the relevant arts, the portable electronic device 102 is able to accept commands by presenting icons or other images on the touch screen 104 that a user "touches," otherwise indicates, or performs gestures upon to activate functions. When the portable electronic device 102 is not being actively used as a user input device, the touch screen 104 is able to be "locked." In one example, a locked touch screen 104 is placed into an inactive mode with reduced user input capability to prevent unwanted activation of functions. An example of the usefulness of locking the touch screen 104 (i.e., placing the touch screen 104 in an inactive mode with reduced user input capability that removes an ability to control many functions of the portable electronic device 102), is illustrated by a situation where the portable electronic device 102 is kept in a user's pocket or purse and the user does not want inadvertent activations of functions by other objects in proximity to the portable electronic device 102 coming into contact with the touch screen 104.

In order to "unlock" the touch screen 104 to accept user inputs, the user in one example performs a specified gesture on the touch screen 104. A gesture in this context refers making a particular motion or sequence of motions with one or more fingers or other objects on the face of the touch screen 104. In the illustrated example, an unlock reminder 108 is displayed on the locked touch screen 104 to inform or remind a user to "draw a circle to unlock" the touch screen. In this example, when a user traces a circular path on the locked touch screen 104 with his or her finger or other object, the portable electronic device 102 responds by unlocking the touch screen 104 and presenting, for example, other graphical user interface presentations to allow the user to execute operations and commands. In this example, the touch screen 104 is a user interface that is changeably configurable between a locked mode and an unlocked mode, where the locked mode has reduced user input capability.

In addition to the touch screen 104, the portable electronic device 102 further includes user input buttons 106 that allow a user to implement further operations, such as unlocking the touch screen 104 or dimming the display presented on the touch screen 104. In various examples, the operations defined for the user input buttons 106 are different when the touch screen 104 is locked and unlocked.

The depicted graphical presentation on the touch screen 104 of the locked user display 100 is referred to herein as a locked touch screen display 130. The locked touch screen display 130 includes several display fields. A time field 114 and date field 110 present current time and date information to a user, thereby allowing a user to use the locked touch screen display 130 as a clock. The locked touch screen display 130 further includes a communications status field 112. In the presented example, the communications status field 112 informs the user of the number of missed calls and the number of new messages that the user has received. In the illustrated example, the touch screen 104 is locked and therefore touching areas of the time and date field 110 or the communications status field 112 does not result in any actions being taken by the portable electronic device 102.

The depicted locked touch screen display 130 further contains a social network activity indication field 116. The social network activity indication field 116 in this example provides a real time graphical representation of the number of postings for one or more social network information sources. The contents, significance and operational details of the social network activity indication field 116 are described in further detail below. The illustrated social network activity indication field 116 presented on the locked touch screen display 130 includes a first social network activity indicator 120 that is a displayed curve associated with a first social network. The first social network activity indicator 120 reflects a time sequence of two characteristics of received postings from the first social network during a sequence of time periods.

One posting characteristic reflected by the first social network activity indicator 120 is the volume or amount of postings received by the user from the first social network source at a particular time. The volume of postings at a particular time in this example is reflected by an amplitude position of the displayed curve at that time as measured along the horizontal axis of the social network activity indication field 116. In the illustrated example, the amplitude position is the vertical position of a point on the displayed curve.

Another posting characteristic reflected by the first social network activity indicator 120 is the number of occurrences of specified keywords in the postings received by the user from that source. The number of occurrences of specified keywords at a particular time is reflected by a width of the first social network activity indicator 120 at that time along the horizontal axis.

The social network activity indication field 116 further includes a second social network activity indicator 122 that reflects the number of posting activity and the number of postings that contain a specified keyword for a second social network source. The second social network activity indicator 122 reflects these values in a manner similar to that described above for the first social network activity indicator 120. It is to be noted that the social network activity indication field 116 is presented on the touch screen 104 while the touch screen 104 is in a locked mode that has reduced user input capability.

Figure 2:
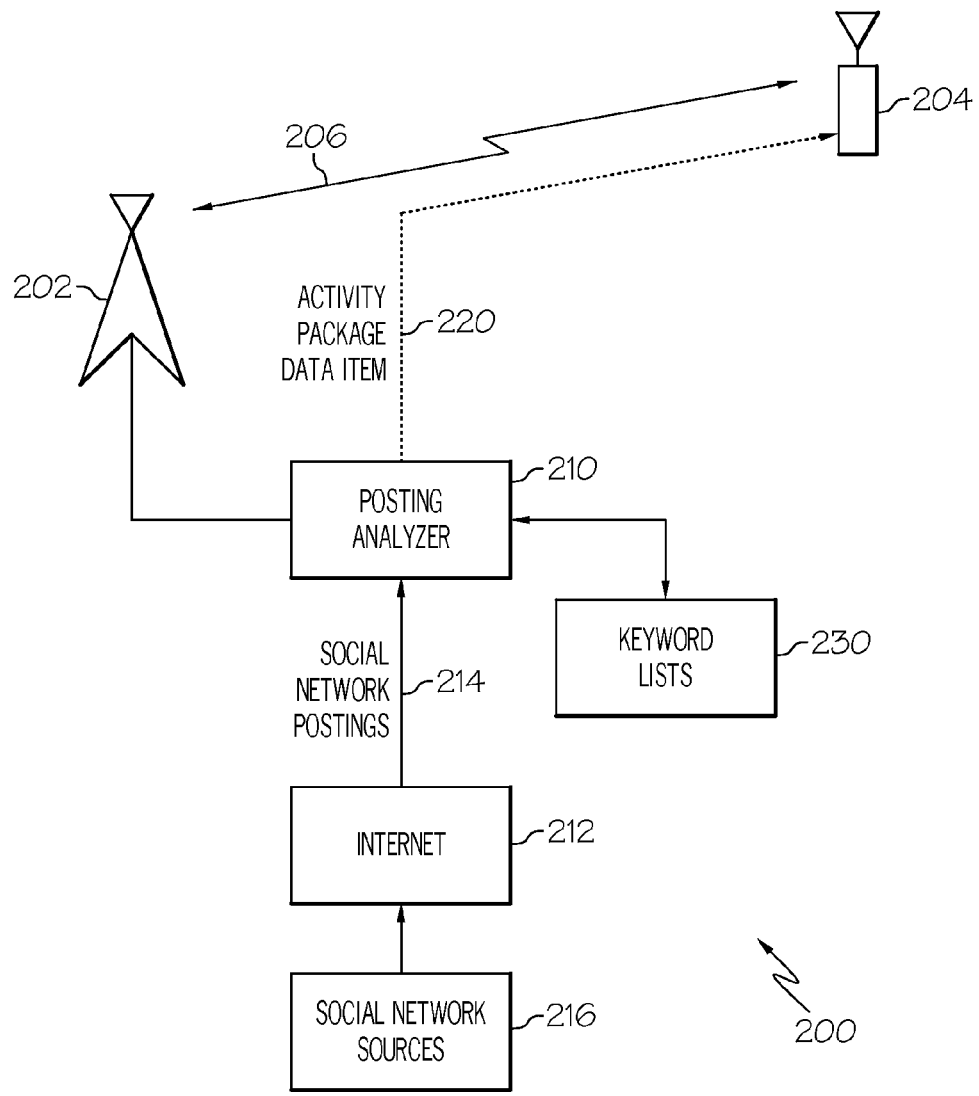
FIG. 2 illustrates a wireless communications system, according to one example.

FIG. 2 illustrates a wireless communications system 200, according to one example. The wireless communications system 200 includes a wireless base station 202 that communicates bi-directionally with a portable electronic device 204 via a wireless communications link 206. The depicted components of the illustrated wireless communications system 200 are intended to present examples of components of actual wireless communications systems that are able to be based upon, for example, commercial cellular or other wireless communications systems. As is understood by practitioners of ordinary skill in the art, some commercial wireless communications systems utilize multiple base stations, similar to the depicted wireless base station 202, to provide communications with many types of mobile communications device, similar to the portable electronic device 204, over a large geographical area. A single wireless base station 202, or a network of such wireless base stations that provide cellular communications over a large geographic area, are able to provide wireless communications with many wireless user devices, such as the portable electronic device 204. The single wireless base station 202 is illustrated herein to simplify the description of the architecture and operations of one example of the described methods and systems. It is to be understood that the depicted wireless base station 202 includes all wireless communications equipment and other components used to support one directional or bi-directions wireless communications between two devices.

The wireless communications system 200 further includes a posting analyzer 210. The posting analyzer 210 of this example receives data from a communications network, such as the Internet 212. In various examples, the posting analyzer 210 is able to receive data through or from any type of data communications mechanism. In further examples, the posting analyzer 210 is able to create data itself that is able to be analyzed and characterized, as is described in further detail below.

In one example, the posting analyzer 210 receives social network postings 214 from a number of sources for all of the users of portable electronic devices 204. In one example, social networks, such as FACEBOOK™ and TWITTER™, allow users to subscribe to, or otherwise configure those services to send, selected postings to the subscribing user. Examples of social network postings include message postings created by various individuals or entities on a social network site that are made visible to some or all persons using that site. In one example, a user is able to subscribe to postings that originate from one or more sending users of those social networks. In the case of some social networks, a subscribing user is able to specify one or more other users of the social network from which posting are desired. In such cases, the social network sends postings by those other users to the subscribing user. As generally used in the following discussion, the term social network source refers to a particular user or account of a social network service to which a user is able to subscribe or receive postings. A social network source is sometimes referred to by users as a "feed." It is to be understood, however, that the concept of a social network source is also able to broadly include any designated source of data postings, such as a set of users or other generators of postings as well as all postings from a particular social network service. Furthermore, social network sources are able to send postings to users who do not explicitly subscribe or otherwise indicate a desire to receive postings from that source. Although the following discussion uses an example of receiving and analyzing postings from social network sources, it is clear that the principles described herein are applicable to analysis and presentation of posting status for any other type or types of data sources.

As is described in further detail below, the posting analyzer 210 receives postings from many social network sources, characterizes the received postings and assembles statistics for the received data. In one example, the posting analyzer 210 maintains a number of counts for each user to which postings are addressed. For example, the posting analyzer 210 maintains a count for each social network source and each user of the number of postings received by that user from that social network source.

The posting analyzer 210 further maintains keyword lists 230. The keyword lists 230 of one example include, for each user of a portable device 204, a list of user specified keywords that are to be identified in each received posting from one or more of a particular social network source. In general, a user is able to specify keywords that are to be noted in all received postings, but some keywords may be associated with one or more social network sources and only postings from those sources are analyzed to determine if the keywords specified for that source are contained in postings from that source.

As social network postings are received for each user and characterized, the posting analyzer 210 maintains accumulated counts over a time duration for each social network source and each user. These accumulated counts include a count value for each user of the total number of received postings that were addressed to that user and the number of those postings that contain keywords that match a user's keyword list. These accumulated counts are posting characterizations that are communicated to the portable device in one example. These posting characterizations are encoded in one example into data packets referred to herein as "activity package data items." In one example, the accumulated counts are represented by being encoded into one of four values that indicate one of four ranges into which the volume of postings falls. In an example of encoding the total number of postings addressed to the user, an encoded value of zero (0) indicates that there was no activity, i.e., no postings from that social network source was received during that time period, while an encoded value of three (3) indicates heavy volume of received postings from that social network source. Keyword occurrences are able to be similarly encoded.

The posting analyzer 210 creates and sends activity package data items 220 to each portable electronic device 204 as the accumulated counts become available at the end of each time duration over which such characterizations are determined. An activity package data item contained within the activity package data items 220, in one example, is a short data message that is addressed to a particular user. In one example, the activity package data item 220 is sent to a portable electronic device 204 that is associated with the user to whom the activity package data item 220 is addressed. Examples of meaning and techniques used to obtain the data contained in the activity package data item 220 are described in further detail below. An example of data contained in an activity package data item 220 for a user that is subscribed to two social network sources is as follows:

3.2; 2.0

Where "3.2" are values that characterize postings from a first social network source during a time duration and "2.0" are values that characterize postings from a second social network source during that time duration. The identification of the particular social network source associated with each value is defined in one example by data contained at both the posting analyzer 210 and the portable electronic device 204. The "3.2" and "2.0" data values contained in the activity package data item are separated by a semi-colon to delimit the encoded values for each social network source that is contained in the activity package. The "3.2" values consist of a first number "3" and a second number "2" that are separated by a period. The period serves as a delimiter of these two numbers. The first number "3" is an encoded value representing the posting volume of the first social network source. In one example, a "3" indicates heavy volume. The second number "2" is an encoded value that indicates the number of occurrences of keywords in the received postings from that social network source. In one example, a "2" indicates between 1 and 3 occurrences of specified keywords.

FIG. 3 illustrates a social network activity timeline table 300, according to one example. The social network activity timeline table 300 depicts a time sequence of posting characterization information for social network data that is received from two social network data sources. Posting information associated with a first social network source is contained within a pair of columns labeled source A 310 and posting information associated with a second source is contained in another pair of columns labeled source B 312.

The social network activity timeline table 300 illustrates posting characterizations for five (5) time periods that each has a duration of five minutes. The time periods are identified by a time period column 314 appearing as a leftmost column. The social network activity timeline table 300 shows in each row of the table data that characterizes the postings received from each social network data source during time period associated with that row. Although the example illustrated for the social network activity timeline table 300 illustrates data for two (2) social network data sources, it is clear that such data is able to be determined for any number or type of data sources, including only one data source.

The social network activity timeline table 300 contains two columns for each social network data source. The social network activity timeline table 300 further contains information for two social network data sources. A first social network data source, labeled "Source A 310," indicates a first social network data source. A second social network data source, labeled "Source B 312," indicates a second social network data source. As discussed above, each of these two social network data sources provide a time series of postings that are received by users who select to receive postings from those sources.

The data for Source A 310 includes two columns, a first "volume posted" column 320 and a first "keyword containing" column 322. The first volume posted column 320 contains a series of numbers that indicate the total number of postings that are received from Source A in the time period of the row containing that number. The first keyword containing column 322 contains a series of numbers that indicate the number of postings within the total number of postings that are received from Source A within that time period that contain specified keywords. As discussed above, specified keywords are used to identify postings that are likely to be of greater interest to the user.

The data for Source B 312 also includes two columns, a second "volume posted" column 324 and a second "keyword containing" column 326. These two columns contain data similar data related to postings received from Source B 312 as was described above for Source A 310. In particular, the second volume posted column 324 contains a series of numbers that indicate the total number of postings that are received from Source B in the time period of the row containing that number. The second keyword containing column 326 contains a series of numbers that indicate the number of postings within the total number of postings that are received from Source B within that time period that contain the specified keywords. As discussed above, specified keywords are able to be used for all data sources, or some data sources are able to have specified keywords that are searched for in postings from one or a subset of sources.

The social network activity timeline table 300 has one row of data for each of the five (5) illustrated time periods. A first row 330 has a label "5:00" in the time period column 314 that indicates that the data in that row reflects a time period that ended at five (5) minutes. A second row 332 has a label "10:00" in the time period column 314 that indicates that the data in that row reflects a time period that ended at ten (10) minutes. A third row 334 has a label "15:00" in the time period column 314 that indicates that the data in that row reflects a time period that ended at fifteen (15) minutes. A fourth row 336 has a label "20:00" in the time period column 314 that indicates that the data in that row reflects a time period that ended at twenty (20) minutes. A fifth row 338 has a label "25:00" in the time period column 314 that indicates that the data in that row reflects a time period that ended at twenty five (25) minutes.

The first row 330 contains a value of thirty (30) in the first volume posted column 320 and a value of two (2) in the first keyword containing column 322. These values indicate that during the first time period, which has a duration of five (5) minutes and ends at time "5:00," thirty (30) total postings were received from Source A 310 and two (2) of those contained specified keywords. Continuing with data characterizing postings received from Source A 310, the second row 332 contains a "volume posted" value of fifty (50) and a "keyword containing" value of eight (8), the third row 334 contains a "volume posted" value of thirteen (13) and a "keyword containing" value of six (6), the fourth row 336 contains a "volume posted" value of seven (7) and a "keyword containing" value of zero (0), and the fifth row 338 contains a "volume posted" value of twenty eight (28) and a "keyword containing" value of twelve (12). These values indicate the number of total postings and the number of those postings that contained a specified keyword, respectively, that were received from Source A 310 during each respective five (5) minute period represented by that row.

The rows of the social network activity timeline table 300 contain two columns of similar information that characterizes messages received from Source B 312. In this particular example for Source B 312, the first row 330 contains a "volume posted" value of fifty (50) and a "keyword containing" value of two (2), the second row 332 contains a "volume posted" value of eight hundred (800) and a "keyword containing" value of fifteen (15), the third row 334 contains a "volume posted" value of three hundred and thirty three (333) and a "keyword containing" value of zero (0), the fourth row 336 contains a "volume posted" value of four hundred and eighty five (485) and a "keyword containing" value of six (6), and the fifth row 338 contains a "volume posted" value of six hundred and three (603) and a "keyword containing" value of eighteen (18).

FIG. 4 illustrates a quantizing threshold value table 400, according to one example. The posting characterization data presented in the social network activity timeline table 300 indicates raw values of posting volumes and number of postings that contain specified keywords. In order to more efficiently communicate the information in the social network activity timeline table 300 in one example, the data is encoded by storing and transmitting lower resolution numbers that represent a range of values for each of the quantization values. In one example, the characterization data presented in the social network activity timeline table 300 is encoded to values between zero (0) and three (3) based upon value thresholds defined for each source or multiple sources. By mapping data within the social network activity timeline table 300 into four ranges and efficiently encoding that mapping, each of the data items is able to be essentially compressed by using values that are representable, i.e., can be represented, by two data bits. This reduced data representation is used in one example to efficiently encode these characterization values into activity package data items 220 for communication of data reflecting posting volumes and occurrences of keyword containing postings to portable electronic devices, where the portable electronic devices will present that data to a user.

The quantizing threshold value table 400 has three columns: an encoded output value column 402, a Source A volume Range column 404, and a Source B volume Range column 406. The encoded output value column 402 indicates the encoded value that represents the actual data values that fall within the particular ranges defined by data within the other columns. The Source A volume Range column 404 contains values that define thresholds, i.e., range separating values, for the ranges of the volume posted values contained in the first volume posted column 320 discussed above. The Source B volume Range column 406 similarly contains values that define thresholds for ranges of volume posted values contained in the second volume posted column 324 discussed above. The relationship between the value ranges and the values in the Source A volume Range column 404 and the Source B volume Range column 406 is described below.

The quantizing threshold value table 400 has four (4) rows of data that reflect each of the ranges into which data is to be encoded. A first row 410 has zero (0) in the encoded output value column 402, and zero (0) in both the Source A Range column 404, and the Source B Range 406. The zero value in the encoded output value column 402 indicates that a range of "volume posted" values between values in the Source A volume Range column 404, and the Source B volume Range column 406 contained in this row and the next lower row, i.e., the second row 412, are to be represented by the value zero (0). The zeros stored in the Source A volume Range column 404, and the Source B volume Range column 406 of this row are placeholder values that indicate that the range represented by this row includes values that are stored in the first volume posted column 320 or the second volume posted column 324, respectively, that are greater than zero (0), which is the lowest possible number in this example of simply counting postings that occur during time durations.

The quantizing threshold value table 400 further has a second row 412 that contains a value of one (1) in the encoded output value column 402. The second row 412 has a value of five (5) stored in the Source A volume Range column 404 and a value of one hundred (100) stored in the Source B volume Range column 406. The values stored in the Source A volume Range column 404, and the Source B volume Range column 406 indicate the lower value thresholds for regions that are identified by an encoded output value of one (1). The values in the second row 412 of the Source A volume Range column 404 and the Source B volume Range column 406 also define the upper threshold of the range encoded by encoded values of the first row 410, i.e., the range of values that are identified by the encoded output value zero (0). In the particular example illustrated for the quantizing threshold value table 400, the first range, which is represented by the encoded output value zero (0), for the "Volume Posted" values for Source A 310 includes values greater than or equal to zero (0), as defined by the value in the first row 410 of the Source A volume Range column 404, and less than five (5), as defined by the value in the second row 412 of the Source A volume Range column 404. Similarly for Source B 312, the first range represented by the value zero (0) for Source B 312 includes values greater than or equal to zero (0), as defined by the value in the first row 410 of the Source B volume Range column 406, and less than one hundred (100), as defined by the value in the second row 412 of the Source B volume Range column 406.

The third row 414 defines lower threshold values for the Volume Posted values that are assigned to the range identified by an encoded output value of two (2). The values in the third row 414 contain fifteen (15) in the Source A volume Range column 404 and three hundred (300) in the Source B volume Range column 406. These values within the third row 414 define the lower threshold for the range that is associated with an encoded output value of two (2) as is defined in the encoded value output column 402 of the third row 414. These values further define the upper threshold of the range associated with the encoded output value of one (1). In the illustrated example, when considering the range thresholds defined by the entries of the second row 412 and the third row 414, the range associated with an encoded output value of one (1) for Source A 310 is between five (5) and fifteen (15), and the range with the encoded output value of one (1) for Source B 312 is between one hundred (100) and three hundred (300).

The fourth row 416 defines lower threshold values for the Volume Posted values that are assigned to the range identified by an encoded output value of three (3). The values in the fourth row 416 contain thirty (30) in the Source A volume Range column 404 and five hundred (500) in the Source B volume Range column 406. These values within the fourth row 416 define the lower threshold for the range that is associated with an encoded output value of three (3). Because there are only four rows in the quantizing threshold value table 400, any value of the Volume Posted data that is above the threshold in the fourth row 416 is within the range associated with the encoded output value three (3). These values also define the upper threshold of the range associated with the encoded output value of two (2). In the illustrated example, when considering the range thresholds defined by the entries of the third row 414 and the fourth row 416, the range associated with an encoded output value of two (2) for Source A 310 is between fifteen (15) and thirty (30), and the range with the encoded output value of two (2) for Source B 312 is between three hundred (300) and five hundred (500).

The values stored in the Source A volume Range column 404 and the Source B volume Range column 406 are determined based upon empirical observations of posting volumes for the different posting sources. The values stored for a particular source, such as values stored in one of the Source A volume Range column 404 or the Source B volume Range column 406, are able to be modified or updated to track posting statistics accumulated for postings for the feeds from that particular source that are addressed to a particular user, or for postings from that particular source to other users or groups. In various examples, the threshold values for increasing encoded range values for a particular social network source are able to increase linearly, exponentially, or by any relationship or by no explicit relationship.

FIG. 5 illustrates an encoded social network posting table 500 according to one example. The encoded social network posting table 500 is generated based upon the posting characterizations presented in the social network activity timeline table 300 in combination with the range mappings and encoding values presented in quantizing threshold value table 400. In one example, the encoded social network posting table 500 is used to create encoded posting characterization values contained in activity package data items 220 that are sent to portable electronic devices 204 or to any posting trend analyzer 210 for an individual, group, or other receiver.

The encoded social network posting table 500 has a time column 520 that indicates the time period associated with data contained in the other columns of each row. The time values contained in the time column 520 of encoded social network posting table 500 correspond to the time values contained in the time period column 314 of the social network activity timeline table 300, discussed above. The encoded social network posting table 500 depicts data for two posting sources, a Source A 510 and a Source B 512. These two sources correspond to the two sources discussed above with regards to the social network activity timeline table 300 and the quantizing threshold value table 400.

Source A 510 has a first encoded volume posted column 522 and a first encoded keyword containing column 524. Source B 512 similarly has a second encoded volume posted column 526 and a second encoded keyword containing column 528. The first encoded volume posted column 522 contains the encoded output values indicating the range into which data values for the corresponding time periods in the first volume posted column 320 fall. The second encoded volume posted column 526 contains the encoded output values indicating the range into which data values for the corresponding time periods in the second volume posted column 324 fall. These encoded output values are determined in conjunction with quantizing threshold value table 400.

The encoded social network posting table 500 has two columns that contain encoded values that represent Keyword Occurrence values contained in the social network activity timeline table 300. In contrast to the encoding range threshold values depicted in the quantizing threshold value table 400 to characterize volume posted numbers, in one example the keyword occurrence values are encoded using fixed threshold values for all sources. In the example illustrated in the encoded social network posting table 500, an occurrence of between one (1) and three (3) keywords in the postings of a source within the time duration of a particular row is encoded as a value of one (1). An occurrence of between four (4) and eight (8) keywords in the postings of a source within the time duration of a particular row is encoded as a value of two (2). More than nine (9) occurrences of keywords in the postings of a source within the time duration of a particular row is encoded as a value of three (3). If no postings have a keyword, the particular row is encoded as a value of zero (0). Based upon these mappings, the values depicted in the first encoded keyword containing column 524 reflect the range into which values in the first keyword containing column 322 fall. Similarly, the values contained in the second keyword containing column 528 reflect the range into which the values in the second keyword containing column 326 fall.

Each row of the encoded social network posting table 500 corresponds to a row of the social network activity timeline table 300. In particular, the encoded social network posting table 500 has a first encoded row 530 that contains a value of five (5) in the time column 520 to indicate the time interval represented by the data in that row. The first encoded row 530 further contains a value of three (3) in the first encoded value column 522. The value of three in the first encoded value column 522 corresponds to an encoding of the value of thirty (30) that is contained in the first value column 320 of the social network activity timeline table 300 given the Source A encoding data of the quantizing threshold value table 400. As depicted in the Source A Range column 404 of the quantizing threshold value table 400, a value of thirty (30) for Source A posting volumes corresponds to an encoded value of three (3) as specified by the fourth row 416 of the quantizing threshold value table 400. This example entry reflects one design in which values that are equal to a threshold value of a quantization range are encoded as being included in that quantization range. Further examples are able to be encoded as being included in the next lower quantization range.

The first encoded row 530 also contains a value of one (1) in the first encoded keyword containing column 524. The value of one (1) in the first encoded row 530 reflect the first row 330 and in the first keyword containing column 322 in combination with the encoding described above for keyword occurrences. In particular, the value in the first row 330 and in the first keyword containing column 322 is two (2), and keyword occurrence values between one (1) and three (3), inclusive, are encoded with a value of one (1). It is clear that the values in the second encoded volume posted column 526 and the second encoded keyword containing column 528 reflect values in the second volume posted column 324 and the second keyword containing column 326 as are encoded by the Source B Range 406 and the above described keyword occurrence encoding thresholds, respectively.

The second encoded row 532 contains a value of (10) in the time column 520 and indicates to the time interval that corresponds to the data contained in the second row 332 of the social network activity timeline table 300. As discussed above, the values in the first encoded posting volume column 522 and the first encoded keyword containing column 524 correspond to values for Source A 310 in the social network activity timeline table 300 as encoded by data in the quantizing threshold value table 400 and the above described keyword occurrence encoding thresholds. The values in the second encoded volume posted column 526 and the second encoded keyword containing column 528 similarly correspond to values for Source B 312 in the social network activity timeline table 300 as encoded by data in the quantizing threshold value table 400 and the above described keyword occurrence encoding thresholds. The third encoded row 534, fourth encoded row 536, and the fifth encoded row 538 also contain a time value in the time column 520 and similarly encoded information in the remaining columns.

Figure 6:
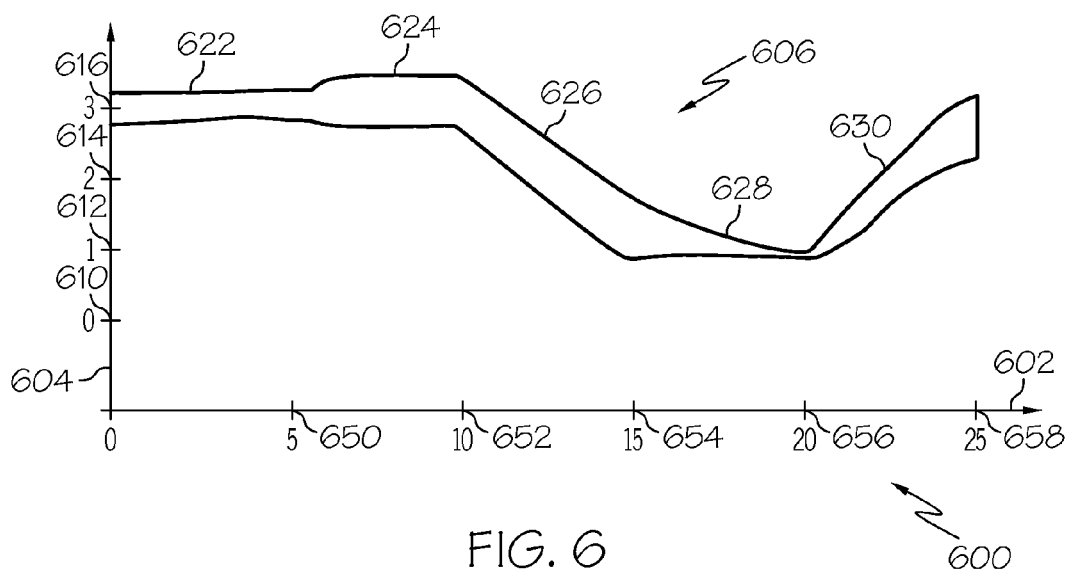
FIG. 6 illustrates a Source A posting volume indicator according to an example.

FIG. 6 illustrates a Source A posting volume indicator 600 according to an example. The Source A posting volume indicator 600 presents a Source A displayed curve 606 that represents the data contained in the encoded social network posting table 500 for Source A. The Source A posting volume indicator 600 depicts a horizontal axis 602 and a vertical axis 604. The horizontal axis 602 represents time with a number of time intervals indicated thereon. In the illustrated example, the time intervals correspond to the time durations between entries of the rows of the above described encoded social network posting table 500. The horizontal axis 602 has five time marks, a five minute mark 650, a ten minute mark 652, a fifteen minute mark 654, a twenty minute mark 656, and a twenty-five minute mark 658. These time marks correspond to the time values listed in the time column 520. The vertical axis represents a magnitude of the encoded values in the first encoded volume column 522 that represent the postings volumes during the respective time intervals.

In addition to representing the data contained in the first encoded volume column 522, the Source A displayed curve 606 also represents the data contained in the first encoded keyword containing column 524. In the illustrated example, the data contained in the first encoded keyword containing column 524 is represented by the thickness of the displayed curve 606 between the two time points that define a time duration associated with each row of the encoded social network posting table 500. As discussed and shown in further detail below, displayed curves such as the Source A displayed curve 606 are able to have one of four thicknesses, a first thickness corresponds to an encoded value of zero (0), a second thickness corresponds to an encoded value of one (1), a third thickness corresponds to an encoded value of two (2), and a fourth thickness corresponds to an encoded value of four (4).

The illustrated Source A displayed curve 606 is thereby independently able to depict two independent values. The value that indicates a posting volume for a certain time period is indicated by the amplitude position, e.g., the illustrated vertical position, of the Source A displayed curve 606. The value that indicates the keyword occurrence during a time period is indicated by the width of the Source A displayed curve 606.

In this illustrated example, both the posting volume data and the keyword occurrence data are encoded to have one of four possible values. The vertical position of the Source A displayed curve 606 is therefore able to vary between zero (0) and three (3) and the thickness off the Source A displayed curve 606 is able to have one of four thicknesses. In other examples, data are able to be encoded with any number of possible values and displayed curves representing two independent values are able to have a corresponding number of possible vertical positions and thicknesses.

In the illustrated example, the Source A displayed curve 606 depicts data contained in the first encoded volume posted column 522 and the first encoded keyword containing column 524. In the time interval prior to the first time point 650, a first portion 622 of the Source A displayed curve 606 has a vertical position, or amplitude position, of three (3), to reflect the value in the first encoded row 530 and first encoded volume posted column 522, and a second width that reflects the value of one (1) in the first encoded row 530 and first encoded keyword containing column 524. In the time interval between the first time point 650 and the second time point 652, a second portion 624 of the Source A displayed curve 606 has a vertical position of three (3), to reflect the value in the second encoded row 532 and first encoded posting volume column 522, and a second width that reflects the value of two (2) in the second encoded row 532 and first encoded keyword containing column 524. It is noted that the vertical position of the Source A displayed curve 606 is the same for these two time intervals, but the displayed curve width is thicker and has a third thickness for the latter time interval to reflect the higher value of keyword occurrences, i.e., two (2), in the second time interval.

In the time interval between the second time point 652 and the third time point 654, a third portion 626 of the Source A displayed curve 606 transitions to a vertical position of one (1) to reflect the value in the third encoded row 534 and first encoded volume posted column 522. The Source A displayed curve 606 retains its thickness in the third portion 626 with a third thickness to reflect the value of two (2) in the third encoded row 534 and first encoded keyword containing column 524.

In the time interval between the third time point 654 and the fourth time point 656, a fourth portion 628 of the Source A displayed curve 606 retains its vertical position because the value of one (1) is also in the fourth encoded row 536 of the first posting volume column 522. The Source A displayed curve 606, however, reduces its thickness to a first thickness to reflect the keyword occurrence value of zero (0) in the fourth encoded row 536 and first encoded keyword containing column 524. Between the fourth time point 656 and the fifth time point 658, a fifth portion 630 of the Source A displayed curve 606 transitions to a vertical position of two to reflect the value in the fifth encoded row 538 of the first posting volume column 522. The thickness of the Source A displayed curve 606 in this interval increases to a fourth thickness to reflect the keyword occurrence value of three (3) in the fifth encoded row 538 and first encoded keyword containing column 524.

Figure 7:
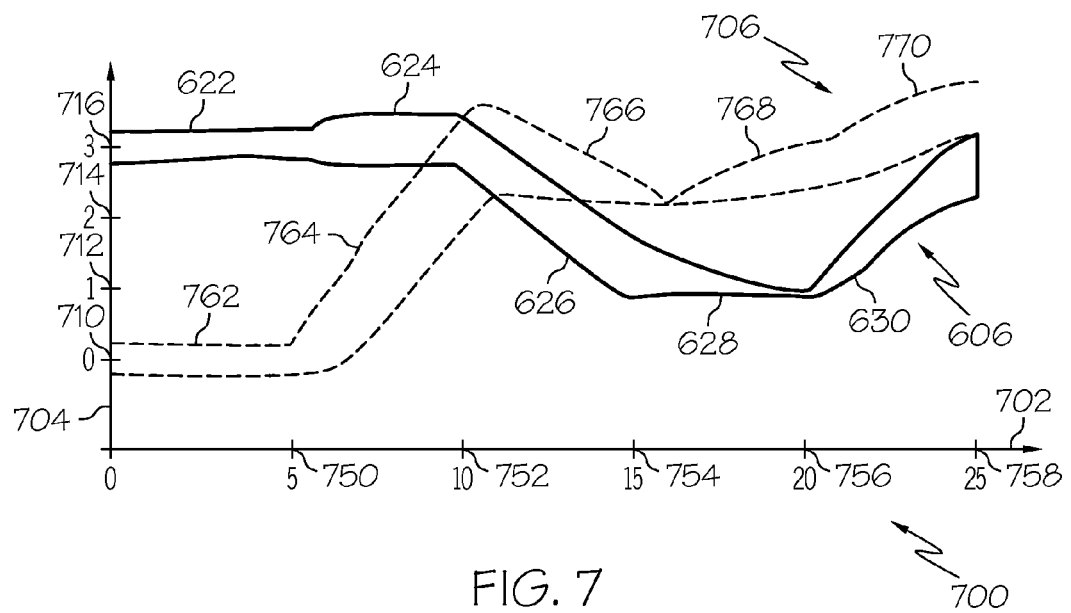
FIG. 7 illustrates a combined posting volume indicator according to an example.

FIG. 7 illustrates a combined posting volume indicator 700 according to an example. The combined posting volume indicator 700 includes the Source A displayed curve 606 described above along with a Source B displayed curve 706 that depicts the encoded posting volume and keyword occurrence values for Source B 512 as depicted in the second encoded posting volume column 526 and the second encoded keyword containing column 528. The combined posting volume indicator 700 has a horizontal axis that depicts time and has is divided into five time intervals in a manner similar to that discussed above with regards to FIG. 6. The combined posting volume indicator 700 has a vertical scale with is also marked at four levels to reflect the four possible values for posting volumes as was discussed above with regards to FIG. 6. In one example, the combined posting volume indicator 700 is an expanded view of the social network activity indication field 116.

The vertical positions and thicknesses of the Source A displayed curve 606 were discussed above. The Source B displayed curve 706 has similar general characteristics to depict the values of the encoded social network posting table 500 for Source B 512, including the second encoded volume posted column 526 and the second encoded keyword containing column 528. A first portion 762 of the Source B displayed curve 706 appears before the first time marker 750 has a vertical position of zero (0) and a second thickness that indicates an encoded keyword occurrence value of one (1), to reflect the values contained in the first encoded row 530 of the second encoded volume column 526 and second encoded keyword containing column 528, respectively.

A second portion 764 of the Source B displayed curve 706 appears between the first time marker 750 and a second time marker 752. The second portion 764 transitions to a vertical position of three (3) and a fourth thickness that indicates an encoded keyword occurrence value of three (3), to reflect the values contained in the second encoded row 532 of the second encoded volume column 526 and second encoded keyword containing column 528, respectively. A third portion 766 of the Source B displayed curve 706 appears between the second time marker 752 and a third time marker 754. The third portion 766 transitions to a vertical position of two (2) and a first thickness that indicates an encoded keyword occurrence value of zero (0), to reflect the values contained in the third encoded row 534 of the second encoded volume column 526 and second encoded keyword containing column 528, respectively. A fourth portion 768 of the Source B displayed curve 706 appears between the third time marker 754 and a fourth time marker 756. The fourth portion 768 retains its vertical position of two (2) and transitions to a third thickness that indicates an encoded keyword occurrence value of two (2), to reflect the values contained in the second fourth 536 of the second encoded volume column 526 and second encoded keyword containing column 528, respectively. A fifth portion 770 of the Source B displayed curve 706 appears between the fourth time marker 756 and a fifth time marker 758. The fifth portion 770 transitions to a vertical position of three (3) and a fourth thickness that indicates an encoded keyword occurrence value of three (3), to reflect the values contained in the fifth encoded row 538 of the second encoded volume column 526 and second encoded keyword containing column 528, respectively.

The combined posting volume indicator 700 is a graphical display that presents a compact representation to a user that shows posting volume and keyword occurrence data for a number of social network sources over time. Although such information is shown for only two social network sources, it is clear that such information for any number of social network sources is able to be presented in a similar manner. Each source is able to be indicated by various techniques on a graphical display. For example, the Source A displayed curve 606 is able to be presented in red and the Source B displayed curve 706 is able to be presented in green. Other displayed curves are able to be presented in different colors. Overlapping portions of two or more displayed curves are able to be presented as, for example, hash marks, other colors, outlines, or any representation that presents graphical displayed curve data to a user.

In one example, the combined posting volume indicator 700 is presented on a locked screen to allow a user to visual social network posting activity with quick look. In an example, the displayed curves of the combined posting volume indicator 700 are updated in response to receiving activity package data items 220. Furthermore, the combined posting volume indicator 700 is able to be updated in response to receiving a newly received activity package data item 220. For example, a portable electronic devices 204 is able to receive a time sequence of activity package data items 220 that contain respective data items that characterize postings from social network sources over respective time durations. In response to receipt of a received activity package data item 220, the displayed curves of the combined posting volume indicator 700 are scrolled to the left to create an available displayed area in the rightmost time interval, such as between the fourth time marker 756 and a fifth time marker 758. After scrolling the displayed curves, new portions of the displayed curves that have amplitude positions, such as vertical positions, and thicknesses that reflect data items in the received activity package data item.

Figure 8:
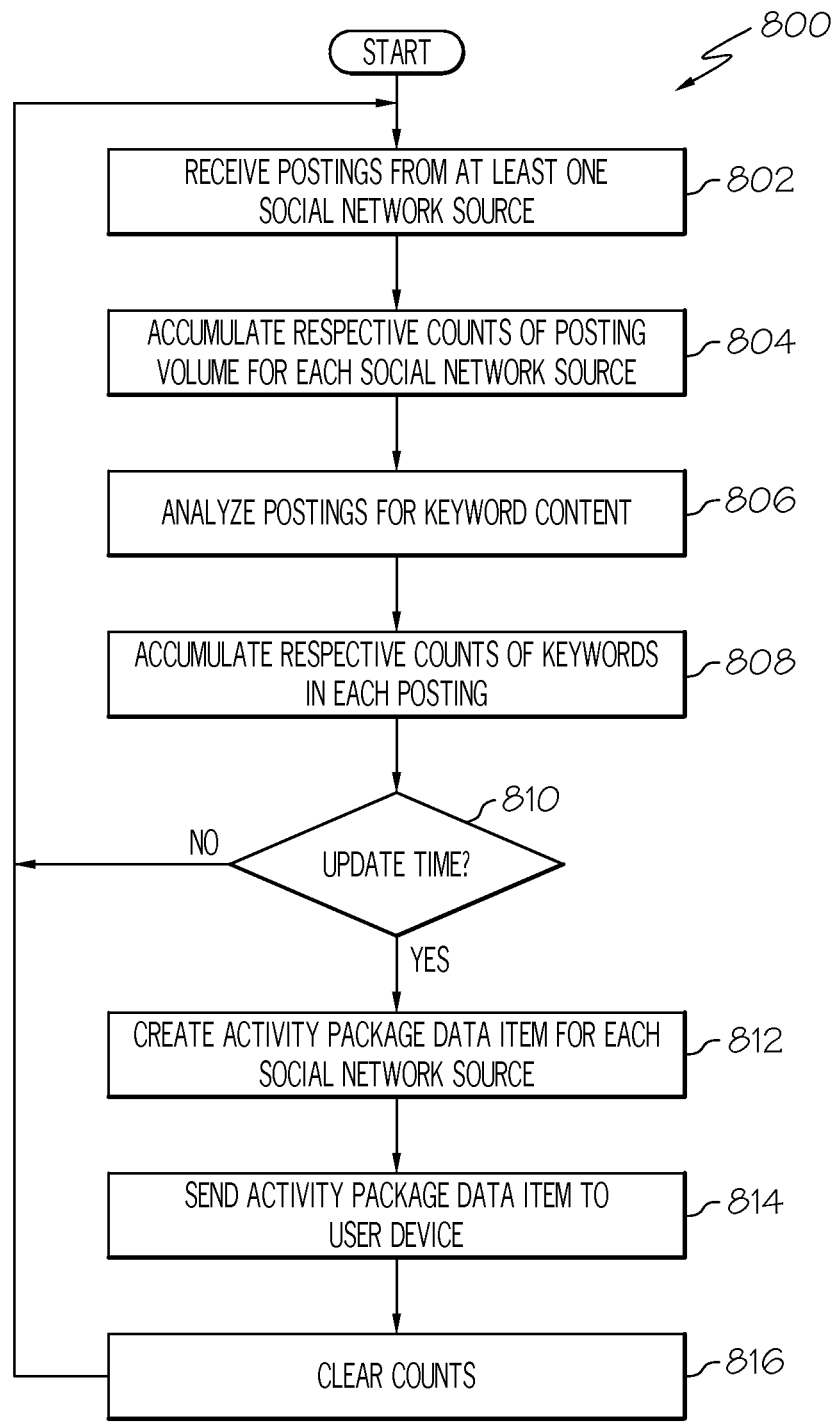
FIG. 8 illustrates a social network feed analysis process according to an example.

FIG. 8 illustrates a social network feed analysis process 800 according to an example. The social network feed analysis process 800 is an example analysis of data feed sources to determine posting characterizations. Social network feeds are an example of data feed sources. The social network feed analysis process 800 of one example is performed by the posting analyzer 210, described above, that receives postings from multiple sources that are directed to particular individuals or groups. As described below, the posting analyzer 210 analyzes received postings according to the social network feed analysis process 800 and produces posting characterizations that are encoded into activity package data items to send to portable electronic devices 204, where those activity package data items include encoded data representing characterizations of volumes of postings and occurrences of keywords in those posting.

The social network feed analysis process 800 begins by receiving, at 802, one or more postings from a social network data source. The social network feed analysis process 800 continues by accumulating, at 804, a respective count of postings that have been received from each source. In one example, a counter is maintained for each source and for each receiving user. The counter for a particular source and receiving user is then incremented once for each received message that is addressed to that particular user.

The social network feed analysis process 800 continues by analyzing, at 806, each posting to determine if keywords are present in the postings. In one example, a text search of each posting is performed to identify specified keywords that are defined for the receiving user for the source from which the message was received.

The social network feed analysis process 800 proceeds by accumulating, at 808, a respective count of keywords for each source and receiving user that occurred in the received postings. In one example, the count of keywords indicates the number of times that any keyword appeared in any message. In that example, a message containing three keywords results in incrementing the counter by three. In an alternative example, the count of keywords indicates the number of postings that contain one or more specified key words. In this alternative example, one message containing three keywords results in incrementing the counter by one.

The social network feed analysis process 800 proceeds by determining, at 810, if the posting activity time duration has expired. In various examples, the counts accumulated at 804 and 808 are accumulated over a defined time duration. If that time duration has not expired, the social network feed analysis process 800 returns to receiving, at 802, postings and proceeds to process them as discussed above.

If the time duration has expired, the social network feed analysis process 800 proceeds to create, at 812, an activity package data item that contains information for each receiving user. In one example, encoded data reflecting the posting volume and keyword occurrences for all social network sources sending postings to a particular user are accumulated into a single activity package data items for each time duration. Further examples are able to use other techniques to create and format activity package data items to send to a user.

In one example, the activity package data items contain encoded values that represent which range the actual values of the characteristic fall. As described above, the volume posted characteristic and the keyword occurrence characteristic have values that are encoded based upon which of four ranges of values the actual value falls. These four ranges are representable by two data bits. The activity package data items created by the social network feed analysis process 800 represent data items as encoded values that are represented with four bits.

The social network feed analysis process 800 then proceeds by sending, at 814, the created activity package data item to its associated receiving user. The social network feed analysis process 800 then proceeds to clear, at 816, the counts for the user and returns to receiving, at 802, postings and processing them as described above.

Figure 9:
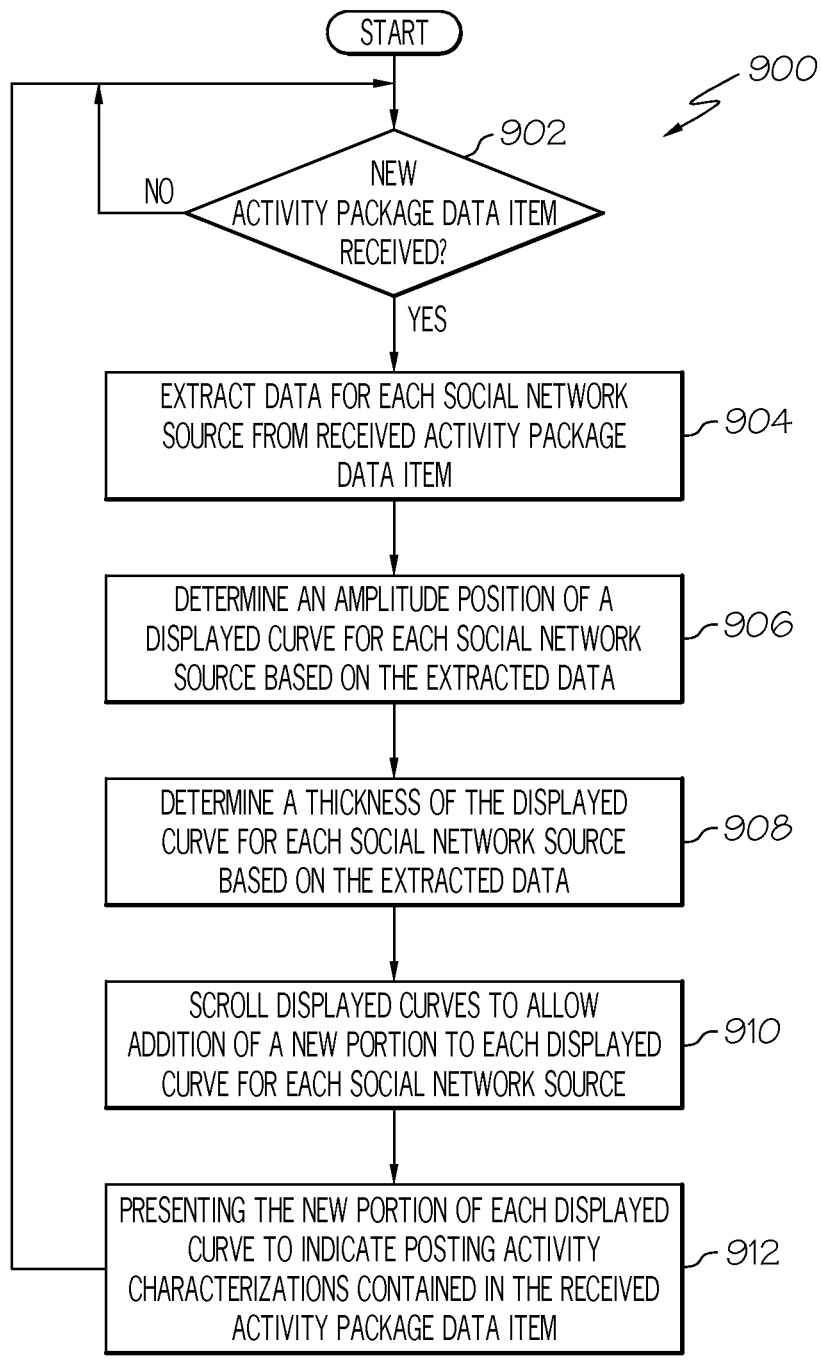
FIG. 9 illustrates an activity package data item receiving and displayed curve update process according to one example.

FIG. 9 illustrates an activity package data item receiving and displayed curve update process 900 according to one example. The process activity package data item receiving and displayed curve update process 900 is performed in one example by a processor within a portable electronic device, such as the portable electronic device 204 described above. As also described above, activity package data items are created, for example, by a posting analyzer 210 and contain encoded values of positing characterizations, such as posting volumes and keyword occurrences, for each social network feed to which a user of a particular portable electronic device 204 subscribes. The activity package data item receiving and displayed curve update process 900 processes received activity package data items and updates displayed curve data based upon the social network source posting characterizations conveyed in the newly received activity package data item.

The activity package data item receiving and displayed curve update process 900 begins by waiting to receive an activity package data item. The activity package data item receiving and displayed curve update process 900 begins by determining, at 902, if a new activity package data item has been received. If an activity package data item is not received, the process returns to determining, at 902, if a new activity package data item has been received. If it is determined that a new activity package data item has been received, the activity package data item receiving and displayed curve update process 900 continues by extracting, at 904, data contained in the received activity package data item. In one example, received activity package data items contain encoded posting information for each social network source to which a user of the receiving device subscribes.

The activity package data item receiving and displayed curve update process 900 continues by determining, at 906, the amplitude position for each displayed curve for each respective social network source based on information extracted from the received activity package data item. As described above, the amplitude position of a particular displayed curve is determined in one example by an encoded value that reflects the volume of postings received from the social network source associated with that displayed curve.

The activity package data item receiving and displayed curve update process 900 continues by determining, at 908, a thickness of each displayed curve for each social network source. As described above, the thickness of the displayed curve for a particular time period is determined in one example by an encoded value contained in and extracted from the received activity package data item. That encoded value reflects the number of occurrences of keywords specified by a user for the social network source that occurred during the time period in the social network source associated with that displayed curve.

The activity package data item receiving and displayed curve update process 900 continues by scrolling, at 910, the presently displayed curves for each social network source to create a an available displayed area on a display device to display a new portion of each displayed curve that represents data contained in the received activity package data item. In one example, the displayed curves that indicate social network are presented as a scrolling presentation of curves where the displayed curves are moved to the left of a display screen as time elapses, and new portions of the displayed curve are presented on the right side of the display screen in the available displayed area that was freed by the scrolling of the displayed curves. In further examples, other techniques are able to be used to present pleasant or informative animations of the displayed curves to depict the movement of data into the past as time elapses and the replacement of the most recent data with more recent data as activity package data items are received.

The activity package data item receiving and displayed curve update process 900 continues by presenting, at 912, new portions of each displayed curve to indicate posting activity characterizations contained in the received activity package data items. In one example, a device displays a representation of the posting characterizations by presenting these new portions of each display. As indicated above, the new displayed curve portions in one example are drawn in an area of the display that was freed by scrolling of the previously present displayed curve depictions. It is further to be noted that this displaying of posting characterizations by presenting new portions of each displayed curve is performed when the user interface of the displaying device is in a locked mode. The activity package data item receiving and displayed curve update process 900 then returns to determining, at 902, if a new activity package data item was received.

Figure 10:
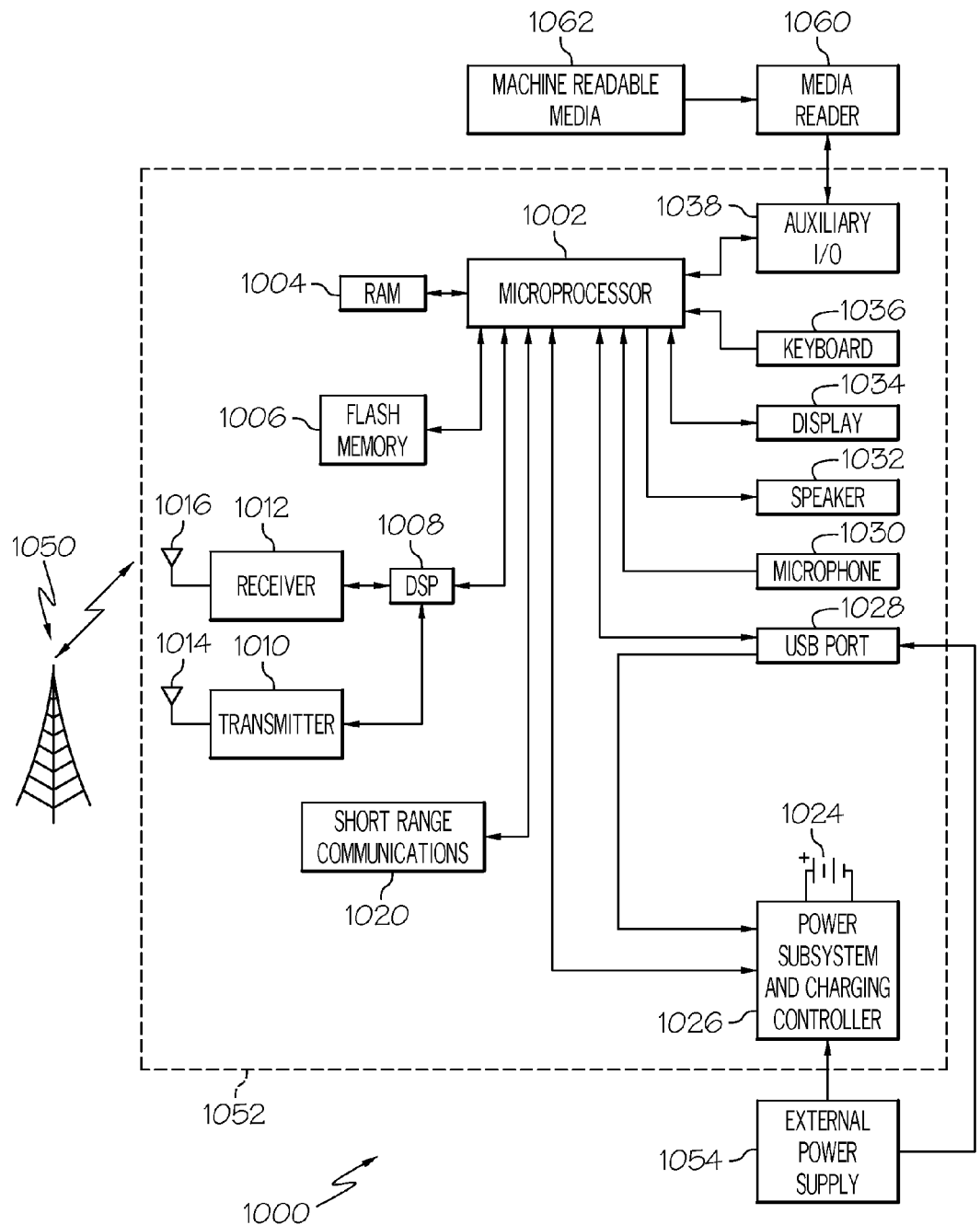
FIG. 10 is a block diagram of an electronic device and associated components in which the systems and methods disclosed herein may be implemented.

FIG. 10 is a block diagram of an electronic device and associated components 1000 in which the systems and methods disclosed herein may be implemented. In this example, an electronic device 1052 is a wireless two-way communication device, such as portable electronic devices 204, with voice and data communication capabilities. Such electronic devices communicate with a wireless voice or data network 1050 using a suitable wireless communications protocol. Wireless voice communications are performed using either an analog or digital wireless communication channel. Data communications allow the electronic device 1052 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 1052 is an example electronic device that includes two-way wireless communications functions. Such electronic devices incorporate communication subsystem elements such as a wireless transmitter 1010, a wireless receiver 1012, and associated components such as one or more antenna elements 1014 and 1016. A digital signal processor (DSP) 1008 performs processing to extract data from received wireless signals and to generate signals to be transmitted. The particular design of the communication subsystem is dependent upon the communication network and associated wireless communications protocols with which the device is intended to operate.

The electronic device 1052 includes a microprocessor 1002 that controls the overall operation of the electronic device 1052. The microprocessor 1002 interacts with the above described communications subsystem elements and also interacts with other device subsystems such as flash memory 1006, random access memory (RAM) 1004, auxiliary input/output (I/O) device 1038, Universal Serial BUS (USB) Port 1028, display 1034, keyboard 1036, speaker 1032, microphone 1030, a short-range communications subsystem 1020, a power subsystem and charging controller 1026, and any other device subsystems.

The display 1034 is able to be a touch screen display such as is discussed above. In the case of a touch screen display, the display 1034 provides user input information to microprocessor 1002 in addition to presenting information provided by microprocessor 1002. In the case of a touch screen display 1034, the keyboard 1036 may not be included in the electronic device 1052 or the keyboard 1036 may include a reduced number of keys, such as the user input buttons 106 described above. As also discussed above, the display 1034 is able to be changeably configurable between a locked mode and an unlocked mode. In one example, the microprocessor 1002 further acts as a display controller that is configured to display various information and images on the display 1034.

A power pack 1024 is connected to a power subsystem and charging controller 1026. The power pack 1024 provides power to the circuits of the electronic device 1052. The power subsystem and charging controller 1026 includes power distribution circuitry for providing power to the electronic device 1052 and also contains power pack charging controller circuitry to manage recharging the power pack 1024.

The USB port 1028 provides data communication between the electronic device 1052 and one or more external devices. Data communication through USB port 1028 enables a user to set preferences through the external device or through a software application and extends the capabilities of the device by enabling information or software exchange through direct connections between the electronic device 1052 and external data sources rather than through a wireless data communication network.

Operating system software used by the microprocessor 1002 is stored in flash memory 1006. Further examples are able to use a power pack backed-up RAM or other non-volatile storage data elements to store operating systems, other executable programs, or both. The operating system software, device application software, or parts thereof, are able to be temporarily loaded into volatile data storage such as RAM 1004. Data received via wireless communication signals or through wired communications are also able to be stored to RAM 1004. As an example, a computer executable program configured to perform the social network feed analysis process 800 and the activity package data item receiving and display curve update process 900, described above, is included in a software module stored in flash memory 1006.

The microprocessor 1002, in addition to its operating system functions, is able to execute software applications on the electronic device 1052. A predetermined set of applications that control basic device operations, including at least data and voice communication applications, is able to be installed on the electronic device 1052 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 1052 through, for example, the wireless network 1050, an auxiliary I/O device 1038, USB port 1028, short-range communications subsystem 1020, or any combination of these interfaces. Such applications are then able to be installed by a user in the RAM 1004 or a non-volatile store for execution by the microprocessor 1002.

In a data communication mode, a received signal such as a text message or web page download is processed by the communication subsystem, including wireless receiver 1012 and wireless transmitter 1010, and communicated data is provided the microprocessor 1002, which is able to further process the received data for output to the display 1034, or alternatively, to an auxiliary I/O device 1038 or the USB port 1028. A user of the electronic device 1052 may also compose data items, such as e-mail messages, using the keyboard 1036, which is able to include a complete alphanumeric keyboard or a telephone-type keypad, in conjunction with the display 1034 and possibly an auxiliary I/O device 1038. Such composed items are then able to be transmitted over a communication network through the communication subsystem.

For voice communications, overall operation of the electronic device 1052 is substantially similar, except that received signals are generally provided to a speaker 1032 and signals for transmission are generally produced by a microphone 1030. Alternative voice or audio I/O subsystems, such as a voice message recording subsystem, may also be implemented on the electronic device 1052. Although voice or audio signal output is generally accomplished primarily through the speaker 1032, the display 1034 may also be used to provide an indication of the identity of a calling party, the duration of a voice call, or other voice call related information, for example.

Depending on conditions or statuses of the electronic device 1052, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 1020 is a further optional component which may provide for communication between the electronic device 1052 and different systems or devices, which need not necessarily be similar devices. For example, the short-range communications subsystem 1020 may include an infrared device and associated circuits and components or a Radio Frequency based communication module such as one supporting Bluetooth® communications, to provide for communication with similarly-enabled systems and devices.

A media reader 1060 is able to be connected to an auxiliary I/O device 1038 to allow, for example, loading computer readable program code of a computer program product into the electronic device 1052 for storage into flash memory 1006. One example of a media reader 1060 is an optical drive such as a CD/DVD drive, which may be used to store data to and read data from a computer readable medium or storage product such as computer readable storage media 1062. Examples of suitable computer readable storage media include optical storage media such as a CD or DVD, magnetic media, or any other suitable data storage device. Media reader 1060 is alternatively able to be connected to the electronic device through the USB port 1028 or computer readable program code is alternatively able to be provided to the electronic device 1052 through the wireless network 1050.

Information Processing System

The present subject matter can be realized in hardware, software, or a combination of hardware and software. A system can be realized in a centralized fashion in one computer system, or in a distributed fashion where different elements are spread across several interconnected computer systems.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of displaying posting volumes, the method comprising:
   receiving, on a device, an activity package data item comprising posting characterizations for at least one data feed source, the posting characterizations for each data feed source comprising:
      a respective first data item reflecting a volume of postings received for a user associated with the device from a respective data feed source within the at least one data feed source, and
      a respective second data item reflecting a number of occurrences of keywords specified by the user for the respective data feed source within the at least one data feed source during a time duration,
   the device comprising a user interface changeably configurable between one of a locked mode and an unlocked mode, the locked mode comprising reduced user input capability;
   extracting the first data item and the second data item from the activity pack data item; and
   displaying, in response to the receiving the activity package data item and extracting the first data item and the second data item and when the user interface is configured into the locked mode, a respective displayed curve for each of the at least one feed source, the respective displayed curve for each of the at least one data source feed having respective amplitude positions based upon the respective first data item extracted from the activity package data item and thicknesses based upon the respective second data item extracted from the activity package data item.

2. The method of claim 1, further comprising:
   receiving, on the device, a time sequence of activity package data items each containing a sequential respective first data item and a sequential respective second data item characterizing postings received from the at least one data feed source,
      each activity package data item in the time sequence of activity package data items corresponding to a respective time duration, the respective time durations being different from one another, and
      the each respective activity package data item comprising the sequential respective first data item reflecting a volume of postings received for a user associated with the device received during the corresponding respective time duration of the respective activity package data item and
      the sequential respective second data item reflecting a number of occurrences of keywords specified by the user during the corresponding respective time duration of the respective activity package data item for the respective data feed source within the at least one data feed source,
   determining, in response to receiving each activity package data item in the time sequence of activity package data items and based upon the sequential respective first data item, a respective subsequent amplitude position for the respective displayed curve for each of the at least one data feed source;
   determining, in response to receiving each activity package data item in the time sequence of activity package data items and based upon the sequential respective second data item, a respective subsequent thickness of the respective displayed curve for each of the at least one data feed source; and
   wherein the displaying the respective displayed curve further comprises modifying the respective displayed curve, in response to receiving a received activity package data item in the time sequence of activity package data items and based upon the respective subsequent amplitude position and the respective subsequent thickness, to reflect the respective first data item and the respective second data item of the received activity package data item.

3. The method of claim 2, wherein the displaying comprises scrolling, in response to receiving the received activity package data item, the respective displayed curve to create an available display area, and
   wherein the modifying the respective displayed curve comprises displaying a new portion of the respective displayed curve with the respective subsequent amplitude position and the respective subsequent thickness in the available display area.

4. The method of claim 1, wherein:
   the respective first data item is represented as a first encoded value that represents a first range into which the volume of postings falls, and
   wherein the respective second data item is represented as a second encoded value that represents a second range into which the number of occurrences of keywords falls.

5. The method of claim 4, wherein:
   the first encoded value is selected from a first number of values representable by a first number of data bits,
   the second encoded value is selected from a second number of values representable by a second number of data bits, and
   wherein the first encoded value is represented in the activity package data item with the first number of data bits, and the second encoded value is represented in the activity package data item with the second number of data bits.

6. An apparatus for displaying posting volumes, the apparatus comprising:
   a memory;
   a processor;
   a data receiver adapted to receive an activity package data item comprising posting characterizations for at least one data feed source, the posting characterizations for each data feed source comprising:
      a respective first data item reflecting a volume of postings received for a user associated with the apparatus from a respective data feed source within the at least one data feed source, and
      a respective second data item reflecting a number of occurrences of keywords specified by the user for the respective data feed source within the at least one data feed source during a time duration,
      the data receiver further adapted to extract the first data item and the second data item from the activity pack data item;
   a user interface comprising a display, the user interface changeably configurable between one of a locked mode and an unlocked mode, the locked mode comprising reduced user input capability; and
   a display controller, communicatively coupled to the data receiver and the display, adapted to display on the display, in response to the data receiver receiving the activity package data item and extracting the first data item and the second data item, and when the user interface is configured into the locked mode, a respective displayed curve for each of the at least one feed source, the respective displayed curve for each of the at least one data source feed having respective amplitude positions based upon the respective first data item extracted from the activity package data item and thicknesses based upon the respective second data item extracted from the activity package data item.

7. The apparatus of claim 6, the data receiver further adapted to receive a time sequence of activity package data items each containing a sequential respective first data item and a sequential respective second data item characterizing postings received from the at least one data feed source, each activity package data item in the time sequence of activity package data items corresponding to a corresponding respective time duration, the corresponding respective time durations being different from one another, and the each respective activity package data item comprising the sequential respective first data item reflecting a volume of postings received for a user associated with the apparatus received during the corresponding respective time duration of the respective activity package data item and the sequential respective second data item reflecting a number of occurrences of keywords specified by the user during the corresponding respective time duration of the respective activity package data item for the respective data feed source within the at least one data feed source, wherein the display controller is further adapted to:
determine, in response to receipt of each activity package data item in the time sequence of activity package data items and based upon the sequential respective first data item, a respective subsequent amplitude position for the respective displayed curve for each of the at least one data feed source;
determine, in response to receipt of each activity package data item in the time sequence of activity package data items and based upon the sequential respective second data item, a respective subsequent thickness of the respective displayed curve for each of the at least one data feed source; and
wherein the display controller is further adapted to modify the respective displayed curve, in response to the data receiver receiving a received activity package data item in the time sequence of activity package data items and based upon the respective subsequent amplitude position and the respective subsequent thickness, to reflect the respective first data item and the respective second data item of the received activity package data item.

8. The apparatus of claim 7, wherein the display controller is configured to display by scrolling, in response to receiving the received activity package data item, the respective displayed curve to create an available display area, and wherein the display controller is configured to modify the respective displayed curve by displaying a new portion of the respective displayed curve with the respective subsequent amplitude position and the respective subsequent thickness in the available display area.

9. The apparatus of claim 6, wherein:
the respective first data item is represented as a first encoded value that represents a first range into which the volume of postings falls, and
wherein the respective second data item is represented as a second encoded value that represents a second range into which the number of occurrences of keywords falls.

10. The apparatus of claim 9, wherein:
the first encoded value is selected from a first number of values representable by a first number of data bits, the second encoded value is selected from a second number of values representable by a second number of data bits, and
wherein the activity package data item represents the first encoded value with the first number of data bits, and represents the second encoded value with the second number of data bits.

11. Computer readable program code stored on a non-transitory computer-readable medium, the computer readable program code comprising instructions for:
receiving, on a device, an activity package data item comprising posting characterizations for at least one data feed source, the posting characterizations for each data feed source comprising:
a respective first data item reflecting a volume of postings received for a user associated with the device from a respective data feed source within the at least one data feed source, and
a respective second data item reflecting a number of occurrences of keywords specified by the user for the respective data feed source within the at least one data feed source during a time duration,
the device comprising a user interface changeably configurable between one of a locked mode and an unlocked mode, the locked mode comprising reduced user input capability;
extracting the first data item and the second data item from the activity pack data item; and
displaying, in response to the receiving the activity package data item and extracting the first data item and the second data item and when the user interface is configured into the locked mode, a respective displayed curve for each of the at least one feed source, the respective displayed curve for each of the at least one data source feed having respective amplitude positions based upon the respective first data item extracted from the activity package data item and thicknesses based upon the respective second data item extracted from the activity package data item.

12. The computer readable program code of claim 11, the computer readable program code further comprising instructions for:
receiving, on the device, a time sequence of activity package data items each containing a sequential respective first data item and a sequential respective second data item characterizing postings received from the at least one data feed source,
each activity package data item in the time sequence of activity package data items corresponding to a corresponding respective time duration, the corresponding respective time durations being different from one another, and
the each respective activity package data item comprising the sequential respective first data item reflecting a volume of postings received for a user associated with the device received during the corresponding respective time duration of the respective activity package data item and
the sequential respective second data item reflecting a number of occurrences of keywords specified by the user during the corresponding respective time duration of the respective activity package data item for the respective data feed source within the at least one data feed source,
determining, in response to receiving each activity package data item in the time sequence of activity package data items and based upon the sequential respective first data item, a respective subsequent amplitude position for the respective displayed curve for each of the at least one data feed source;

determining, in response to receiving each activity package data item in the time sequence of activity package data items and based upon the sequential respective second data item, a respective subsequent thickness of the respective displayed curve for each of the at least one data feed source; and wherein the instruction for displaying the respective displayed curve further comprise instructions for modifying the respective displayed curve, in response to receiving a received activity package data item in the time sequence of activity package data items and based upon the respective subsequent amplitude position and the respective subsequent thickness, to reflect the respective first data item and the respective second data item of the received activity package data item.

13. The computer readable program code of claim 12, wherein the instructions for displaying comprise instructions for scrolling, in response to receiving the received activity package data item, the respective displayed curve to create an available displayed area, and wherein the instructions for modifying the respective displayed curve comprise instructions for displaying a new portion of the respective displayed curve with the respective subsequent amplitude position and the respective subsequent thickness in the available displayed area.

14. The computer readable program code of claim 11, wherein the respective first data item is represented as a first encoded value that represents a first range into which the volume of postings falls, and wherein the respective second data item is represented as a second encoded value that represents a second range into which the number of occurrences of keywords falls.

15. The computer readable program code of claim 14, wherein:

the first encoded value is selected from a first number of values representable by a first number of data bits, the second encoded value is selected from a second number of values representable by a second number of data bits, and wherein the activity package data item represents the first encoded value with the first number of data bits, and represents the second encoded value with the second number of data bits.

16. A portable electronic device that displays posting volumes, the portable electronic device comprising:

a display; and a processor, communicatively coupled to the display, the processor configured to:

receive, on a device, an activity package data item comprising posting characterizations for at least one data feed source, the posting characterizations for each data feed source comprising:

a respective first data item reflecting a volume of postings received for a user associated with the device from a respective data feed source within the at least one data feed source, and a respective second data item reflecting a number of occurrences of keywords specified by the user for the respective data feed source within the at least one data feed source during a time duration, the device comprising a user interface changeably configurable between one of a locked mode and an unlocked mode, the locked mode comprising reduced user input capability;

extract the first data item and the second data item from the activity pack data item; and display, in response to receipt of the activity package data item and extracting the first data item and the second data item and when the user interface is configured into the locked mode, a respective displayed curve for each of the at least one feed source, the respective displayed curve for each of the at least one data source feed having respective amplitude positions based upon the respective first data item extracted from the activity package data item and thicknesses based upon the respective second data item extracted from the activity package data item.

17. The portable electronic device of claim 16, further comprising a housing containing the display and the processor.

* * * * *